United States Patent Office 3,552,209
Patented Jan. 5, 1971

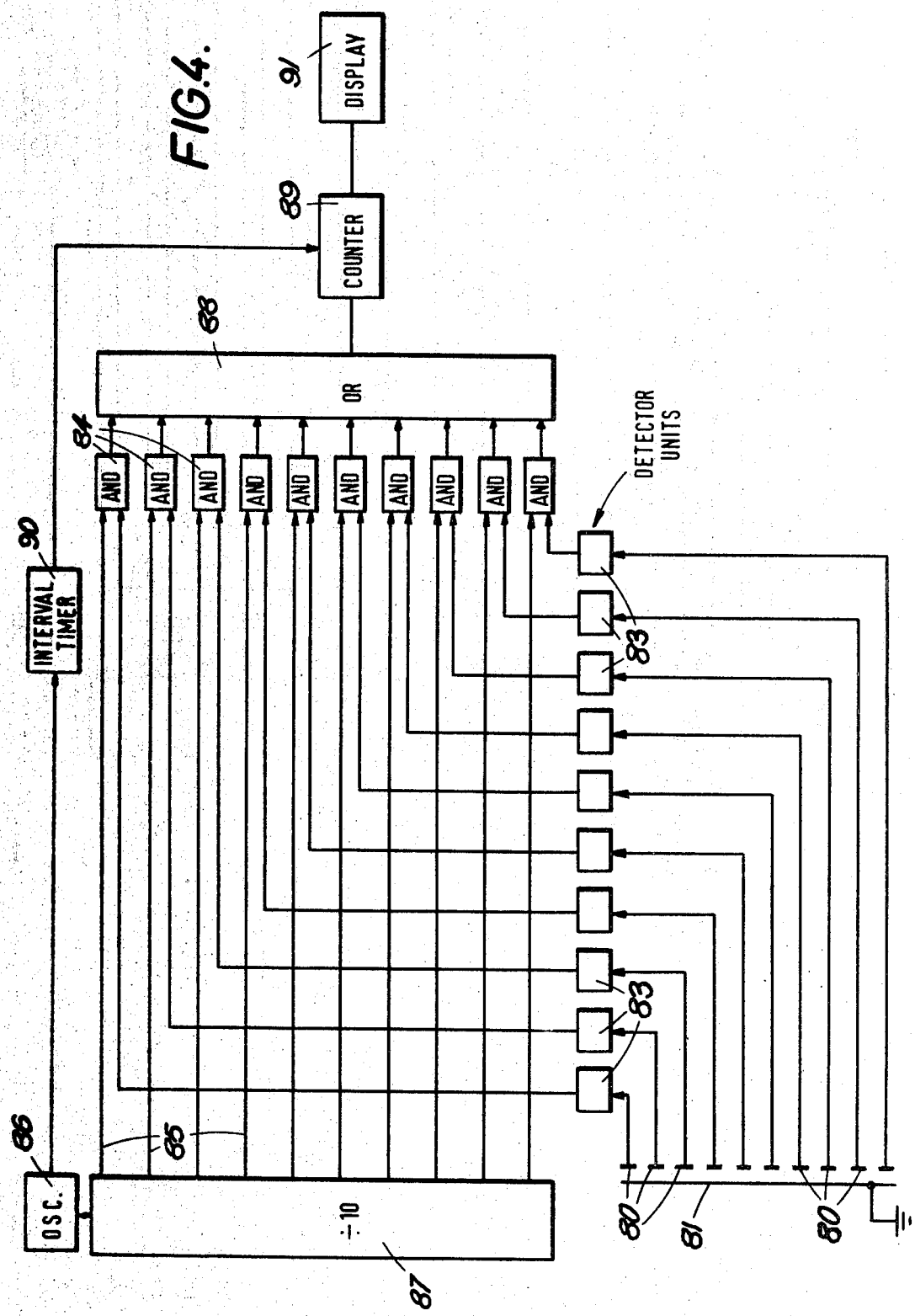

3,552,209
LIQUID LEVEL INDICATORS
James Stewart Johnston, Bognor Regis, England, assignor to Rosemount Engineering Company Limited, Bognor Regis, England, a British company
Continuation-in-part of application Ser. No. 722,461, Apr. 18, 1968. This application Sept. 8, 1969, Ser. No. 856,134
Int. Cl. G01f 23/00
U.S. Cl. 73—304
14 Claims

ABSTRACT OF THE DISCLOSURE

A liquid level indicator, particularly suitable as a tide gauge, indicates the mean level of a liquid. A number of sensing elements, e.g. capacitive electrodes or conductivity sensors, spaced vertically, sense the presence or absence of liquid at each electrode and give signals which may be converted to a binary digital number indicating the instantaneous level. This digital output signal controls a series of AND gates to pass pulses which, for each gate, are at a rate corresponding to the significance of the appropriate digit. The pulses are non-coincident pulses obtained by dividing down the output of an oscillator. The total number of pulses from all the gates over a predetermined period is fed to a counter which indicates the mean level over that period. By using pulse trains, the level is averaged over a period of time enabling the mean level to be determined to an accuracy better than the electrode spacing.

CROSS REFERENCES TO RELATED APPLICATIONS

This application is a continuation-in-part of my application Ser. No. 722,461 filed Apr. 18, 1968 (now abandoned) and entitled "Liquid Level Indicators."

BACKGROUND OF THE INVENTION (1) Field of the invention

This invention relates to liquid level indicators and is directed more particularly to indicators for indicating the mean level of a liquid. The requirement for measuring the mean level of a liquid arises in a number of circumstances, for example, in the measurement of tidal height where one of the problems in determining the sea level is that the sea has surface waves.

(2) Description of the prior art

Present-day tide gauges have quite a number of defects. The majority of them are based on a float and tape system with the result that significant hysteresis is often present in the mechanism and they are subject to the disadvantages of equipment which are dependent on moving parts for their operation. More particularly, however, it is essential that float-operated tide gauges should be contained in a still well, that is to say, a vertical tube enclosing the float which tube has a restriction at the lower end in order to damp out the effect of surface waves. The use of a still well has a number of disadvantages, notably the effective time constant of the gauge is set by the configuration of the still well and a decision to change this at some later stage causes major problems. When used in an estuary, fresh water tends to enter the still well at low water so that, as the tidal height increases and salt water starts to enter the still well, it contains a mixture of salt and fresh water. This would be of lower mean density than the sea water outside with a consequent increase in the level recorded. In fast moving currents, a positive or negative pressure component may be applied at the orifice of the still well as a result of pitot or venturi action. This orifice may easily be blocked by seaweed or rubbish thrown into the area and a particular problem arises since a flap of seaweed or other rubbish may give unidirectional characteristics so that it tends to peak rectify the wave height. These are thus serious disadvantages in the use of the still well. In measuring tidal height, however, it has been necessary to have some hydraulic time constant in order to smooth out the fluctuations of the surface waves.

SUMMARY OF THE INVENTION

It is an object of the present invention to provide a form of liquid level indicator which can be arranged to give a direct indication or record of the mean level of a liquid over a period which can be chosen to be an appropriate length of time for the particular circumstances of the measurement.

According to the invention, a liquid level indicator comprises a plurality of electrical liquid sensors spaced apart in a vertical direction, pulse generating means, and a plurality of gates controlled by said sensors to pass non-coincident pulses from said pulse generating means at an instantaneous repetitive rate corresponding to the liquid level sensed by the sensors, and counting means for determining the total number of output pulses from said gates over a predetermined time interval. By this arrangement, using pulse trains, the liquid level is averaged over the time period of the count. This enables the mean level, where the instantaneous level fluctuates, to be determned to an accuracy better than the spacing between the electrodes. In many cases, the level fluctuates naturally but, if necessary, artificial fluctuations may be introduced to improve the accuracy of determination of the mean level.

Preferably said sensors are arranged to provide an encoded digital output representative of the instantaneous liquid level and there are a number of gates corresponding to the number of bits in said digital output, each gate corresponding to a bit and controlling, in accordance with the magnitude of that bit, the feeding of pulses from an associated source, the sources associated with the various gates having repetitive rates proportional to the significance of the bit corresponding to the gate.

Very conveniently a binary digital system is employed and in a preferred arrangement, a liquid level indicator comprises a plurality of electrical liquid sensors spaced apart in a vertical direction and arranged to give an output in binary digital form representative of the number of these sensors which are below the level of the surface of the liquid, a plurality of AND gates corresponding to the number of binary digits, means for feeding the binary output signals to a first input of each of the AND gates, means for feeding to the other input of the AND gates non-coincident pulse signals at a frequency, for each gate, proportional to the significance of the binary digit supplied to the first input of that gate (that is to say the frequencies are in a geometrical progression with a scale of two) and counting means for determining the total number of output pulses from all the AND gates over a predetermined time interval. Most conveniently, the sensors are capacitive sensing elements and hence the unit for immersion in the liquid may comprise a probe having a series of capacitor electrodes uniformly spaced in the vertical direction. Reference may be made to the specification of U.S. Pat. No. 3,343,415 for a further description of a digital capacitance level detector suitable for this purpose and which gives an electrical output in binary digital form. Alternatively conductivity sensors may be used; these may comprise a series of electrodes spaced uniformly in the vertical direction and uniformly spaced from a co-operating grounded electrode.

Conveniently the pulse signals of the various different frequencies are obtained from an oscillator with a frequency divider chain for giving frequencies successively divided down by the factor of two. These pulse signals and the binary digital representation of the liquid level can be fed to the AND gates as previously described and the outputs from all the various AND gates then fed through an OR gate to said counting means which may conveniently be a decimal counter or a recording device.

Although a binary code has been referred to above, more generally any radix may be used provided a corresponding system of non-coincident pulses is provided.

If the range of liquid levels requires only few electrodes, e.g. ten or twelve, then it may be more convenient not to encode the output but apply a signal from each electrode, indicating whether or not that electrode is immersed, to a separate AND gate; these AND gates serve to gate trains of non-coincident pulses of equal repetition rates, the different trains being non-coincident so that the combined output from the AND gates has a mean frequency representative of the liquid level.

The time duration of the count by the counter may be chosen in accordance with the spacing of the sensing elements and with the chosen frequencies for the pulse signals such that the counter gives a direct display in any required units, e.g. in feet, metres etc. Moreover, since the required duration of the count depends on the frequency of the signals, if an oscillator with a frequency divider chain is used as described above, this oscillator can be used also to control the duration of the count so that the indication is unaffected by variations in the frequency of the oscillations. For this purpose the duration of the count may be controlled by a further counter counting directly the cycles of the oscillator output or of the output from one of the dividers.

Instead of counting the number of pulses in a predetermined time interval using an interval timer controlled from the aforementioned pulse generating means, the mean repetition frequency of the pulses from the gates can be determined and indicated in other ways. In one convenient arrangement, there is provided a bidirectional counter having an incrementing input, a decrementing input and outputs carrying signals representing the instantaneous total count in the counter, means feeding the pulses passed by said plurality of gates into one of said inputs, gating means controlled by signals on the outputs of the counter arranged for gating pulses from said pulse generating means to provide a series of non-coincident pulses having a repetition rate proportional to the count in said counter, and means feeding the pulses from said gating means to the other input of the counter. The count on the counter will exponentially approach a number proportional to the mean repetition rate and this arrangement thus provides effectively a time-constant smoothing of the output indication; this indication moreover is available all the time and not merely at the end of a counting interval.

BRIEF DESCRIPTION OF THE DRAWINGS

FIG. 4 is a diagram illustrating another construction of liquid level indicator.

DESCRIPTION OF THE PREFERRED EMBODIMENTS

Figure 1:
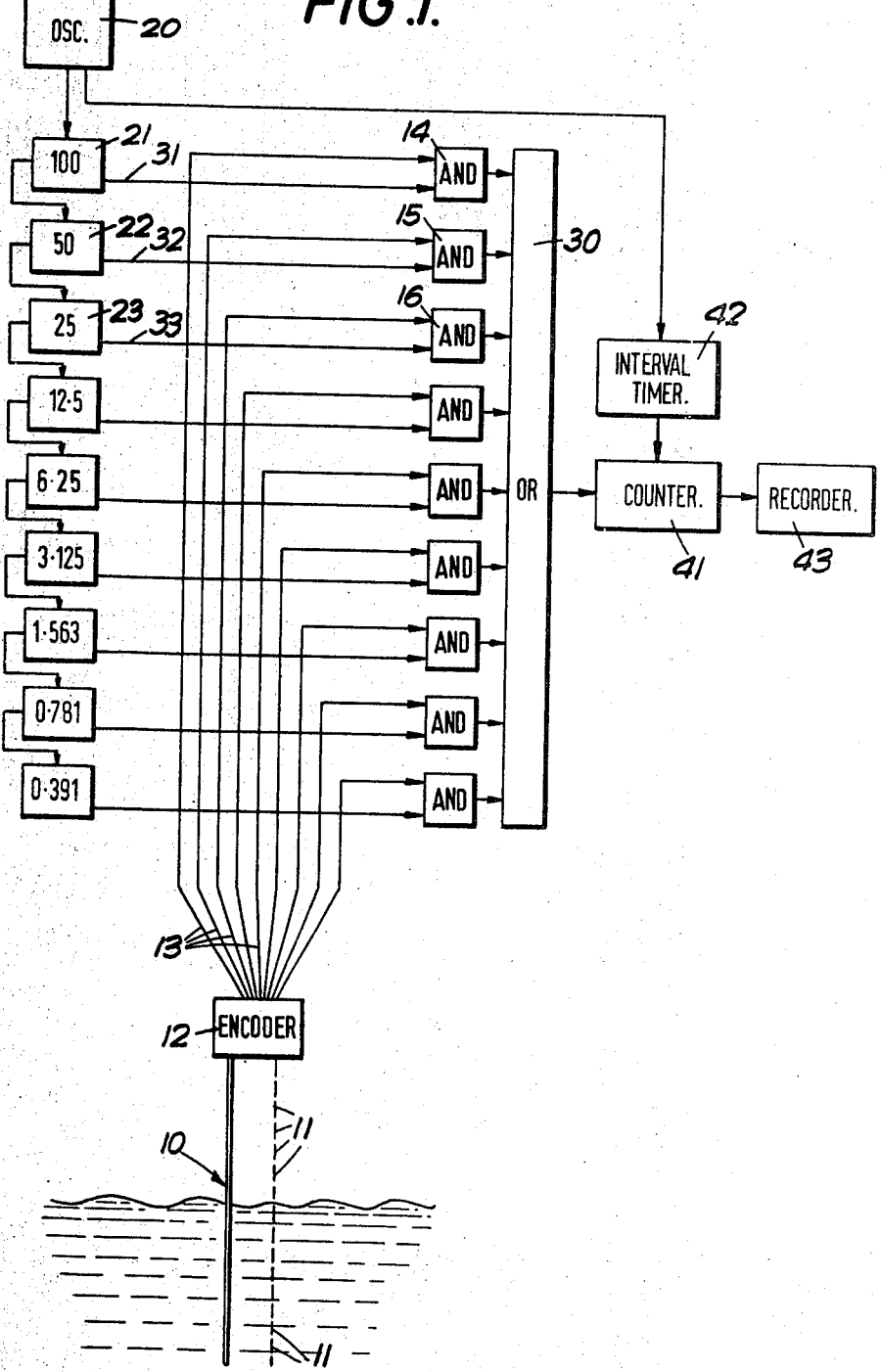
FIG. 1 is a diagram illustrating a tidal gauge.

The tidal gauge of FIG. 1 has a probe unit indicated diagrammatically at 10 with a series of spaced electrodes 11 which are typically 0.1 feet apart. The probe unit is made of such length that the lowest part of it is always immersed in the sea at the lowest tide and the top part remains above the level of the top of the waves at the highest tide. Thus the water level always is intermediate the ends of this probe unit. In the particular construction to be described, there are 400 electrodes 11 for measurements over a range of 40 feet. The electrodes are connected to a drive and detector unit indicated diagrammatically at 12 which provides outputs on a number of leads 13 representative in binary digital form of the instantaneous level of the number of sensing electrodes between the surface of the water and the bottom of the probe. For 400 electrodes, the binary digital output will have nine bits and there are therefore nine leads 13. This drive and detector arrangement is shown in FIG. 2.

The electrodes 11 may be capacitance plates co-operating with a single grounded vertical plate, the capacitance between the various electrodes 11 and the grounded plate being sensed. Alternatively they may be conductivity electrodes, the conductance between the electrodes and a grounded vertical plate being sensed.

Figure 2:
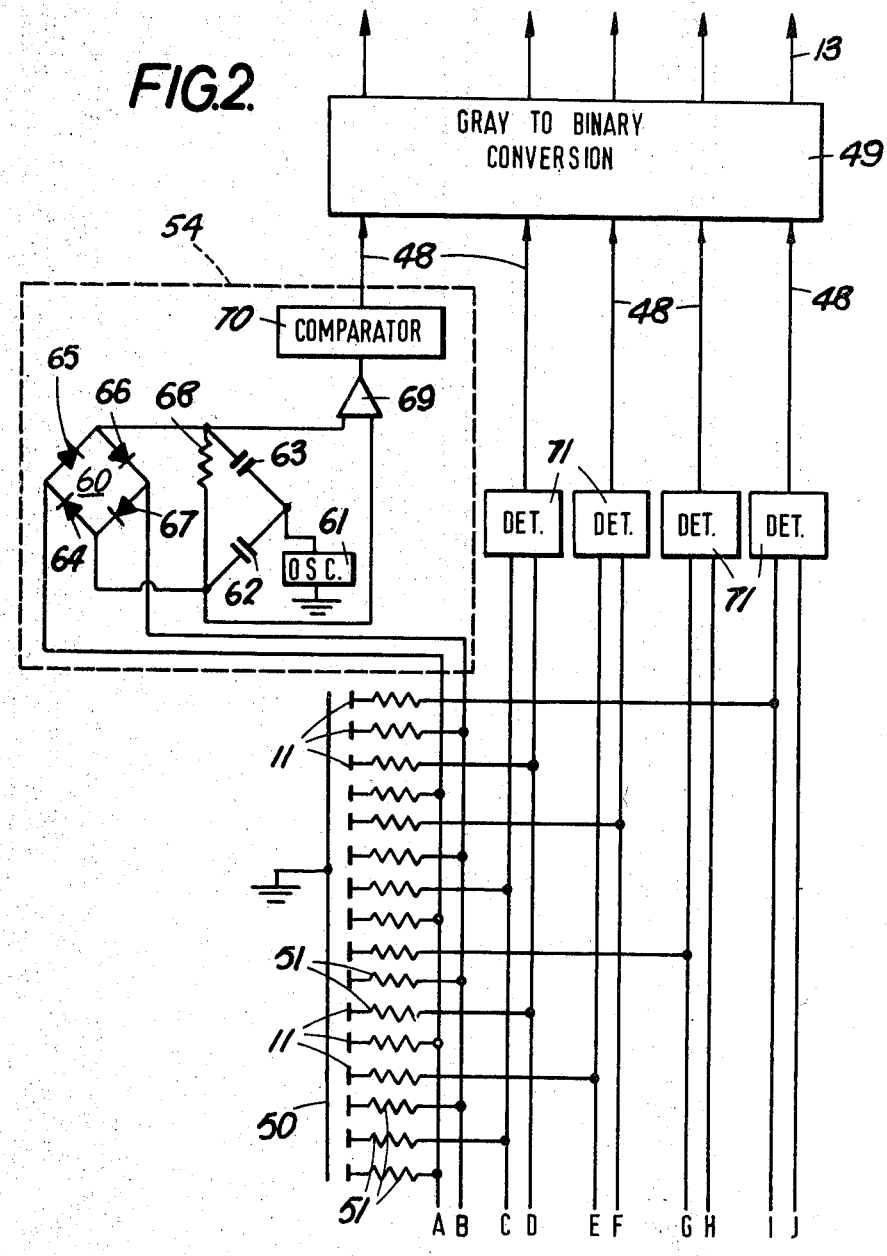
FIG. 2 is a circuit diagram illustrating in further detail one of the units employed in the tidal gauge of FIG. 1.

In FIG. 2, there is shown the probe unit with the electrodes 11 and a grounded metal element 50 adjacent and uniformly spaced from the electrodes 11, the capacitances to this element 50 from the electrodes 11 being utilized for measurement purposes. Only sixteen electrodes 11 are shown in FIG. 2 and only five of the leads 13. The electrodes 11 are connected to pairs of output lines, five such pairs being shown in FIG. 2. The first pair of output lines, which for convenience will be referred to as the A and B lines, are arranged with the A line connected to the 1st, 5th, 9th, 13th etc. electrodes, counting upwardly from the bottom. The B line is connected to the 3rd, 7th, 11th, 15th etc. electrodes counting upwardly from the bottom. It will be seen that if the liquid level only reaches the first electrode, there will be appreciable capacitance to the A line but not to the B line. As the level rises when the third electrode is reached, the capacitances to the two lines would be equal (assuming that the electrode spacing from the common electrode are equal and the electrode areas are equal). When the liquid level reaches the 5th electrode, the capacitance of the A line to the common electrode will increase whilst that of the B line will be unchanged. When the 7th electrode is reached, the capacitance to the B line will be increased and assuming that the other factors are equal, the capacitance to the two lines will again be equal. Thus the relative capacitance of the A and B lines changes in steps and may be regarded as the least significant bit of a Gray code representing the liquid level. The next pair of output lines will be referred to as the C and D lines. The C line may be connected to the 2nd, 10th, 18th, electrodes etc. whilst the D line is connected to the 6th, 14th, 22nd electrodes etc. It will now be seen that the relative capacitance of the C and D lines will change for liquid level changes of four steps thus giving the next most significant digit of the Gray code. A third pair of output lines, referred to as the E and F lines may have the E line connected to the 4th, and the 20th electrodes and the F line connected to the 12th and 28th electrodes thereby giving the next most significant digit of the Gray code output indication. Further pairs of output lines may be provided as necessary so as to give a most significant digit which resolves any ambiguity in the level indication.

With a capacitive sensing system, to prevent the capacitance plates 11 being short circuited to the grounded electrode 50 and to limit the impedance change on immersion, a series impedance, indicated diagrammatically by resistors 51 is provided in series with each electrode 11. In practice this limitation of impedance change is conveniently achieved by a thin plastic coating over all the electrodes. In a conductivity sensing system, series resistors are conveniently employed.

The circuit arrangement shown in the dashed line rectangle 54 in FIG. 2 is used to determine the relative capacitance of the A and B lines to the common electrode 50. In FIG. 2 there are only shown four of the electrodes connected to each of the A and B lines. These lines are connected to a capacitance unbalance detector 60 consisting of two diode pump circuits working in opposition. An oscillator 61 is connected between ground and two D.C. blocking capacitors 62, 63 which pass the oscillator output to the diode pump circuits formed by four diodes 64, 65, 66 and 67. Neglecting diode forward voltage drops, the capacitances on lines A and B are charged to $+V/2$ and $-V/2$ on alternate half cycles if V is the peak-to-peak output voltage of the oscillator 61. During positive half cycles, the capacitance on line A is charged through diode 64 and that on line B is charged through diode 66. During negative half cycles, the charge on the capacitance on line A flows out through diode 65 and that on the capacitance on line B flows out through diode 67. A resistor 68 carries difference of the average D.C. currents and hence the D.C. voltage across this resistor is proportional to the capacitance unbalance. This D.C. voltage is filtered out and amplified by an amplifier 69 and taken to Schmitt trigger circuit 70 or other comparator where it is compared with a reference level set to a value corresponding to a capacitance difference of half the expected charge in capacitance caused by immersing a single electrode. When equal numbers of electrodes are immersed for the two lines A and B, there is no output on the line 48 from the unit 54. This is considered as a binary signal "0" in the Gray code output. When the capacitances are unequal, there is an output which represents a binary digit "1." This output is fed to one of the lines 48. The A and B lines thus give on this line 48 one bit of the required digital number in Gray code, this bit being the least significant digit.

Similar circuits are provided for obtaining digital outputs from each of the other pairs of output lines C, D etc. These pairs of output lines are connected to units 71 (similar to unit 54) which provide output on further leads 48. A Gray-to-binary converter 49 converts the Gray code signals on leads 48 to a true binary code on leads 13. It will thus be seen that a multi-digit signal forming a binary coded digital output is obtained representative of the level of the liquid with respect to the electrodes 11.

This binary coded signal on leads 13 from the unit 12 of FIG. 1 will vary as the water level changes but the effective time constant can readily be made of the order of milliseconds and for present purposes the binary output can be regarded as representative of the instantaneous water level. The binary output is available in parallel form and these digital signals are applied to a series of AND gates 14, 15, 16 etc. (FIG. 1), the most significant digit signal being applied to gate 14, the next most significant to gate 15, and so on. The output from an oscillator 20 is applied ot a binary divider chain consisting of dividers 21, 22, 23, etc., each dividing by a factor of 2 and the dividers being arranged so as to produce non-coincident pulses on a series of output lines 31, 32, 33, etc. Such non-coincident pulses may readily be obtained by arranging that each divider feeds signals alternately to an output circuit and to the next divider in the chain. The oscillator 20 must therefore provide signals at twice the maximum frequency required. For the sake of example, it will be assumed that the oscillator 20 has an output of 200 pulses per second so that the divider 21 gives an output of 100 pulses per second, divider 22 an output of 50 pulses per second and so on. The output from divider 21 is applied to the AND gate 14, the output from divider 22 is applied to AND gate 15, and so on. By using a chain of dividers 21, 22, 23 etc., all the various pulses from the dividers in the chain are non-coincident and thus the various AND gates 14, 15, 16, etc., will give a series of non-coincident output pulses, the number of which in any period will depend on which of the AND gates are open and which are closed. These output pulses from the AND gates are fed through an OR gate 30 to a decimal digital counter 41 which counts the pulses over a time period determined by an interval timer 42.

In the particular example shown in the drawings there are nine divider stages 21, 22 etc., and nine AND gates 14, 15 etc. Assuming that the spacing between the sensing electrodes is 0.1 feet, it will be seen that if only the bottom electrode is immersed in the liquid, one output pulse will be obtained from the OR gate 30 in a time period of 2.56 seconds. If more than one of the electrodes is immersed in the liquid, the number of output pulses obtained in this period will correspond to the number of electrodes immersed. If the time interval counter therefore was arranged to effect the counting for a period of 256 seconds, a water level height of 40 feet would, for example, result in a count on the counter of 40,000. That this is so may readily be seen as follows. Measuring in units of 0.1 feet, 40 feet is 400 units which, in binary form, is 110010000. For a counting period of 256 seconds and if the most significant digit control pulses are at the rate of 100 per second, then the total number of pulses is $(100+50+6.25)256$, i.e. 40,000. It will be seen that the counter displays at the end of its counting period the average pulse frequency over the whole of that period. The mean pulse frequency is directly proportional to the binary number representing the mean level. Thus the number shown on the counter at the end of the counting period is the mean level, over the counting period.

It will be immediately apparent that the time constant for the counting period can be chosen to be of any value appropriate to the given circumstances. The frequency of the oscillator 20 may be adjusted so that a direct numerical indication of the height in the appropriate units is obtained no matter what time period of counting is employed and no matter what is the spacing of the sensing electrodes. It is thus readily possible, for example, to change the indication from feet to metres by introducing a factor of 0.3048 either in the counting period or in the oscillator frequency without altering the construction of the probe unit. The interval timer 42 most conveniently is a further counter counting pulses from the oscillator 20. The time duration of the counting period can be set as required by adjusting the total to which this further counter counts. Using a further counter in this way has the advantage that small variations in the frequency of the oscillator 20 do not affect the liquid level measurement since they are compensated by the change in the counting period.

It should normally be possible to read the mean level to an order of magnitude better than the discrimination set by the positioning of sensors and thus by averaging the fluctuating levels produced by the action of the waves, an interpolation can in effect be made between the discrete levels of the sensors. In the particular example given, the mean level could be displayed to the order of 0.01 feet although the sensors are spaced 0.1 feet apart. This technique for obtaining a measurement of a level to a value more accurate than the discrete displacement of the sensors can be used more generally in the measurement of liquid levels, even in the case of a system where the water level is normally stationary in that, by mechanically oscillating the probe in the vertical direction or by making use of induced perturbation of the surface levels and averaging over a time period, it is possible to obtain this effective greater accuracy.

Where an electrical mains supply of stabilised frequency is available, it may be more convenient to use this supply in place of the oscillator 20; the mains supply may then also be used to provide a clock so that the epoch of the measurement can be recorded as well as the actual magnitude.

In a tidal record for a harbour or inlet there are frequently more rapid fluctuations of considerable amplitude imposed on the tidal swing, caused by the characteristic seiche of the harbour or inlet, that is to say, the circulatory motion of the water in the harbour or inlet, due, for example, to the wind. The period of such a seiche is usually known for any particular harbour, and it may be preferred in measuring the tidal height, to arrange that duration of the sampling period over which the count is taken is as nearly as possible equal to one periodic time of the seiche so that this fluctuation would almost completely disappear from the recording.

The output of the counter 41 may be displayed visually or may be recorded, as indicated at 43, on any suitable medium such as magnetic tape, punched tape or punched cards or it may be transmitted over wire or radio links to a distant point.

Figure 3:
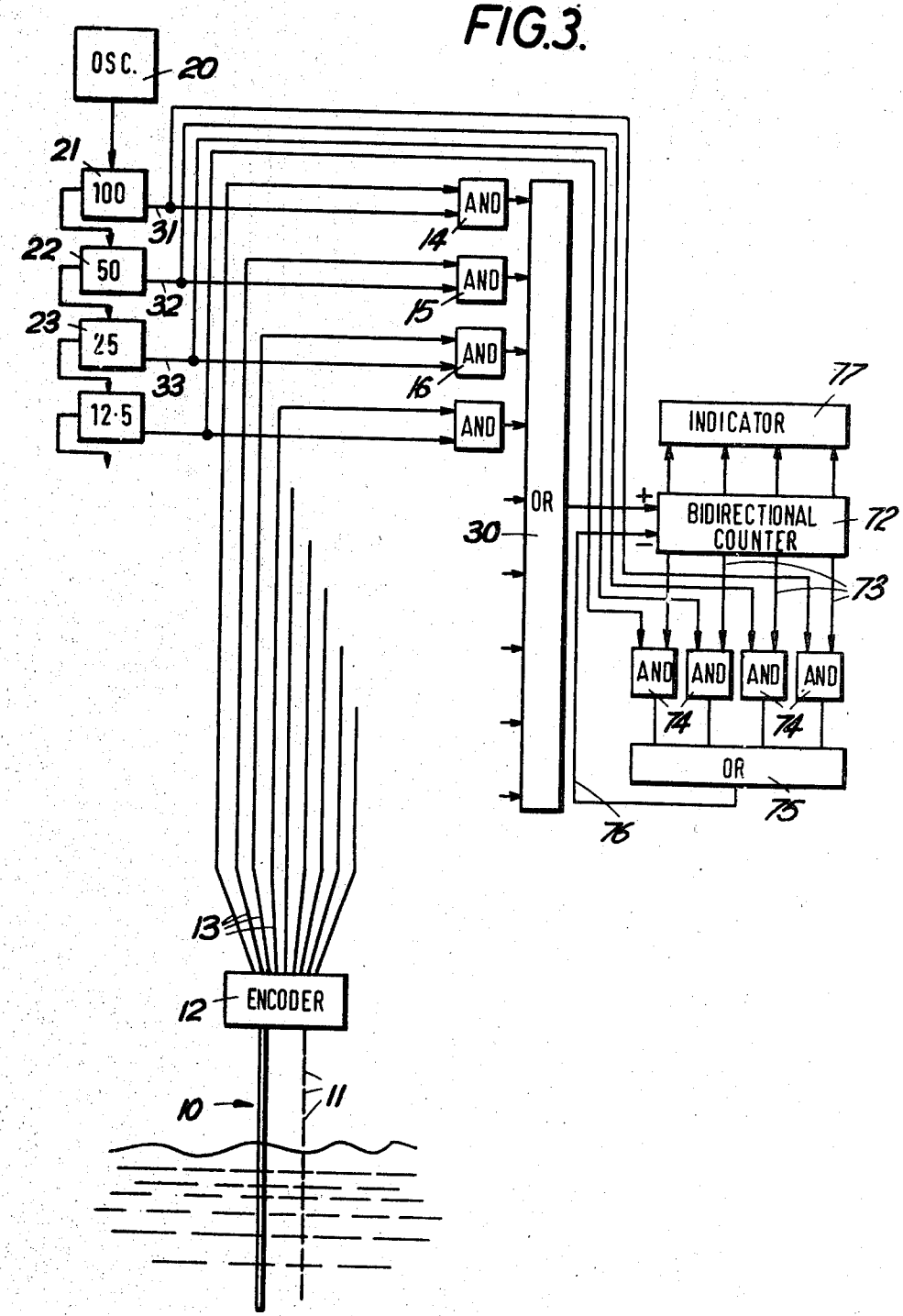
FIG. 3 illustrates a modification of the arrangement of FIG. 1.

FIG. 3 illustrates a modification of the arrangement of FIG. 1, the same reference numerals being used to indicate corresponding components. In the following description, mention will be made only of the distinctive features of FIG. 3. For simplicity, however, only four of the divider stages 21, 22, 23 etc. and of the corresponding AND gates 14, 15, 16 have been shown. The outputs from the OR gate 30 are fed to the incrementing input of a bidirectional counter 72. The count outputs of the counter 72 are fed on leads 73 to respective AND gates 74. The second inputs to the various AND gates 74 are obtained from the leads 31, 32, 33 etc. i.e. there are the same pulse trains as are fed to AND gates 14, 15, 16 etc. The outputs from the AND gates 74 are combined in an OR gate 75 and fed in lead 76 to the decrementing input to the counter 72. It will be seen that, as the count in the counter 72 increases due to pulses coming from the OR gate 30, the number of pulses fed from the OR gate 75 to the decrementing input will also increase. An equilibrium condition is approached exponentially in which the number of incrementing pulses per second from gate 30 is exactly balanced by the number of decrementing pulses per second from gate 75. This condition obtains when the number present in counter 72 is equal to the mean value of the number of pulses from the OR gate 30. This number of pulses represents the height of the liquid above the datum. The arrangement of FIG. 3 using the bidirectional counter 72 behaves as a smoothing time constant; a reading can be taken at any time on an indicator 77 showing the count on the counter 72, this reading representing the mean liquid level. In the arrangement of FIG. 1, on the other hand, a reading can be made only at the end of each time interval determined by the timer 42.

Because of the ability, arising from the use of pulse counting over a period, to give a reading to an accuracy much better than the spacing between the electrodes, this arrangement may be used where only small changes in level occur. For example, for measuring the head of water over a weir, one might use say ten electrodes spaced uniformly over a height range of two feet. The measurement accuracy would be to about ¼ inch. With only ten electrodes, it is not necessary to have a conversion to digital representation before controlling the pulse trains; equal frequency non-coincident trains of pulses may be controlled by gates directly from the various electrodes. Such an arrangement is illustrated in FIG. 4.

In FIG. 4, there are shown ten electrodes 80 adjacent to and equally spaced from a grounded large electro 81. Each electrode 80 is connected to unit 83, which may be similar to the unit 54 of FIG. 2 but which in this case merely have to distinguish between the capacitances in the presence and in the absence of liquid between one electrode 80 and the electrode 81. The outputs from these units 83 are fed to AND gates 84 which gate noncoincident pulses on lines 85 of equal pulse repetition rate. Such pulses may be derived for example from a pulse source 86 and a divider 87 (e.g. a ring counter) dividing by ten, as there are ten electrodes 80. From the AND gates 84, the pulse trains are fed via an OR gate 88 to a counter 89 which counts for a period determined by an interval timer 90, giving an output indication on an indicator 91.

I claim:
1. A liquid level indicator comprising a plurality of electrical liquid sensors spaced apart in a vertical direction, pulse generating means, a plurality of gates, means controlled by said sensors to pass non-coincident pulses from said pulse generating means at an instantaneous repetition rate corresponding to the liquid level sensed by the sensors, said means controlled by said sensors providing an encoded digital output representative of the instantaneous liquid level, said plurality of gates including a number of gates corresponding to the number of bits in said digital output with each gate corresponding to a particular bit, said means controlled by said sensors controlling, in accordance with the magnitude of each particular bit, the feeding of pulses from said pulse generating means to the various gates at the respective repetition rate proportional to the significance of the particular bit corresponding to the gate, and counting means for determining the total number of output pulses from said gates over a predetermined time interval.

2. A liquid level indicator as claimed in claim 1 wherein said counting means comprises a decimal counter.

3. A liquid level indicator as claimed in claim 1 wherein said counting means comprises a recording device.

4. A liquid level indicator as claimed in claim 1 wherein said sensors are capacitive sensing elements.

5. A liquid level indicator comprising a plurality of electrical liquid sensors spaced apart in a vertical direction and arranged to give an output in binary digital form representative of the number of these sensors which are below the level of the surface of the liquid, a plurality of AND gates corresponding to the number of binary digits, means for feeding the binary output signals to a first input of each of the AND gates, means for feeding to the other input of the AND gates non-coincident pulse signals at a frequency, for each gate, proportional to the significance of the binary digit supplied to the first input of that gate and counting means for determining the total number of output pulses from all the AND gates over a predetermined time interval.

6. A liquid level indicator as claimed in claim 5 and in which the numerical representation of the level is binary and wherein said means for feeding pulse signals to said gate at a frequency proportional to the significance of the binary digit supplied to the gate comprising an oscillator with a frequency divider chain for giving frequencies successively divided down by the factor of two.

7. A liquid level indicator as claimed in claim 6 wherein said counting means includes a timer controlled by said oscillator to determine the duration of the count.

8. A liquid level indicator as claimed in claim 6 wherein said counting means includes a timer for controlling the duration of the count which timer comprises a further counter counting directly the cycles from at least one of the dividers.

9. A liquid level indicator as claimed in claim 5 wherein there is provided an OR gate through which the outputs of all the AND gates are fed to said counting means.

10. A liquid level indicator comprising a plurality of electrical liquid sensors spaced apart in a vertical direction, each sensor having associated circuit means giving a signal when the sensor is below the level of the surface of the liquid, a plurality of gates corresponding to the number of sensors and coupled respectively to said circuit means to be opened by said signal so that a number of gates are opened corresponding to the number of sensors immersed, a repetitive signal source, a divider coupled to said signal source to provide a plurality of non-coincident pulse trains each of the same repitition rate, the number of pulse trains corresponding to the number of gates, circuit means feeding the various pulse trains to the respective gates and counting means for determining the total number of output pulses passed by said gates over a predetermined time interval.

11. A liquid level indicator as claimed in claim 10 wherein said counting means includes a timer controlled by said repetitive signal source to determine the duration of the count.

12. A liquid level indicator comprising a plurality of electrical liquid sensors spaced apart in a vertical direction, pulse generating means, a plurality of gates, means controlled by said sensors to pass non-coincident pulses from said pulse generating means at an instantaneous repetition rate corresponding to the liquid level sensed by the sensors, means indicating the mean repetition rate of the pulses passed by said gates, said indicating means comprising a bidirectional counter having an incrementing input, a decrementing input and outputs carrying signals representing the instantaneous total count in the counter, means feeding the pulses passed by said plurality of gates into one of said inputs, gating means controlled by signals on the outputs of the counter arranged for gating pulses from said pulse generating means to provide a series of non-coincident pulses having a repetition rate proportional to the count in said counter, and means feeding the pulses from said gating means to the other input of the counter.

13. A liquid level indicator comprising a plurality of electrical liquid sensors spaced apart in a vertical direction and arranged to give an output in binary digital form representative of the number of these sensors which are below the level of the surface of the liquid, a plurality of AND gates corresponding to the number of binary digits, means for feeding the binary output signals to a first input of each of the AND gates, means for feeding to the other input of the AND gates non-coincident pulse signals at a frequency, for each gate, proportional to the significance of the binary digit supplied to the first input of that gate and means for indicating the mean repetition frequency of all the output pulses from all the AND gates.

14. A liquid level indicator comprising a plurality of liquid sensors, a plurality of AND gates, each having first and second inputs and an output, means for applying signals to certain of said first inputs representative of the level of liquid, pulse generating means, dividing means having an input connected to said pulse generating means and having a plurality of outputs connected to the second inputs of said AND gates for applying non-coincident pulse signals to said second input at pulse rate determined by said dividing means, an OR gate having a plurality of inputs and an output, each OR gate input being connected to an AND gate output, and counting means controlled by said pulse generator means and connected to the output of said OR gate for counting the output pulses provided by said OR gate during a period determined by the number of pulses provided by said pulse generating means, whereby the number of output pulses counted during the such period is representative of the level of liquid sensed by said sensors.

References Cited

UNITED STATES PATENTS 3,157,048   11/1964   Williams _____ 73—304

LOUIS R. PRINCE, Primary Examiner

F. SHOON, Assistant Examiner